US007849770B2

(12) United States Patent
Floding et al.

(10) Patent No.: US 7,849,770 B2
(45) Date of Patent: Dec. 14, 2010

(54) FILM CUTTER

(75) Inventors: Daniel Leonard Floding, Alexandria, MN (US); Paul Howard Wagner, Alexandria, MN (US); Ronald Matthew Gust, Miltona, MN (US); Irvan Leo Pazdernik, Alexandria, MN (US); Richard Jerome Schoeneck, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 880 days.

(21) Appl. No.: 11/186,550

(22) Filed: Jul. 21, 2005

(65) Prior Publication Data

US 2006/0075865 A1 Apr. 13, 2006

Related U.S. Application Data

(63) Continuation-in-part of application No. 10/960,238, filed on Oct. 7, 2004, now abandoned.

(51) Int. Cl.
*B26D 7/06* (2006.01)
*B23D 25/12* (2006.01)

(52) U.S. Cl. .................... 83/42; 83/98; 83/349; 83/402

(58) Field of Classification Search ..................... 83/98, 83/99, 349, 402, 42
See application file for complete search history.

(56) References Cited

U.S. PATENT DOCUMENTS 1,301,964 A * 4/1919 Overbury ..................... 83/349
3,488,912 A 1/1970 Christian
3,545,165 A 12/1970 Greenwell
3,660,961 A 5/1972 Ganz
3,762,256 A * 10/1973 Frantz ......................... 83/402
3,764,085 A 10/1973 Hawkins
3,779,123 A * 12/1973 Chafee .................... 83/698.41
3,791,101 A 2/1974 Monaghan
3,847,045 A 11/1974 Willhite, Jr. et al.
3,855,890 A 12/1974 Lynch et al.
3,871,258 A * 3/1975 Hurn ........................... 83/422
RE28,535 E 9/1975 Ganz
4,237,676 A 12/1980 Buckingham et al.
4,300,421 A * 11/1981 Yano et al. ...................... 83/99
4,422,358 A * 12/1983 Hull et al. ...................... 83/349
4,439,975 A 4/1984 Laing
4,505,412 A * 3/1985 Reba ........................... 83/402
4,542,842 A * 9/1985 Reba ............................. 83/98
4,646,911 A 3/1987 Pearl et al.
4,655,873 A 4/1987 Oly
4,976,089 A * 12/1990 Reichelt ........................ 83/98

(Continued)

*Primary Examiner*—Jason Daniel Prone
(74) *Attorney, Agent, or Firm*—Alan Kamrath; Kamrath & Associates PA

(57) ABSTRACT

A cutting apparatus cuts shrink wrap film residing in a roll. The apparatus includes a first roller pair receiving the film from the roll and carrying the film away from the roll; and without the need for a second roller pair to receive the cut sheet of film. Film snap-back is prevented by cutting the film between a shear deck with teeth and a rotating blade with teeth intermeshing with the teeth of the shear deck. A method for cutting a sheet of shrink wrap film, includes: feeding the film into a first roller pair; and cutting the film between the first roller pair and the second roller pair using a rotating knife with a number of teeth intermeshing with a shear bar with teeth.

17 Claims, 9 Drawing Sheets

U.S. PATENT DOCUMENTS

| | | | | |
|---|---|---|---|---|
| 5,036,739 | A | 8/1991 | Clar | |
| 5,146,820 | A * | 9/1992 | Nemeth et al. | 83/345 |
| 5,189,865 | A | 3/1993 | Andrade et al. | |
| 5,259,543 | A | 11/1993 | Downing | |
| 5,305,578 | A | 4/1994 | Menayan | |
| 5,359,915 | A * | 11/1994 | Hitz | 83/349 |
| 5,428,941 | A | 7/1995 | Staub | |
| 5,445,054 | A * | 8/1995 | Pryor | 83/349 |
| 5,450,709 | A | 9/1995 | Steding | |
| 5,765,344 | A | 6/1998 | Mandeville et al. | |
| 5,771,662 | A | 6/1998 | Struges et al. | |
| 5,850,771 | A * | 12/1998 | Killian | 83/23 |
| 6,142,049 | A * | 11/2000 | Schweitzer et al. | 83/349 |
| 6,327,948 | B1 * | 12/2001 | Tuori | 83/98 |
| 6,422,283 | B1 * | 7/2002 | Okushita et al. | 156/521 |
| 6,619,014 | B2 | 9/2003 | Muller | |
| 6,625,954 | B2 | 9/2003 | Forrest | |
| 6,739,115 | B1 | 5/2004 | Malini | |
| 6,994,773 | B2 * | 2/2006 | Beisswanger et al. | 83/23 |
| 2002/0148874 | A1 | 10/2002 | Drefs et al. | |
| 2004/0154447 | A1 * | 8/2004 | Di Carlo et al. | 83/311 |
| 2006/0075861 | A1 * | 4/2006 | Flooding et al. | 83/436.3 |

* cited by examiner

FILM CUTTER

This patent application is a continuation-in-part of U.S. application Ser. No. 10/960,238, filed Oct. 7, 2004 now abandoned.

BACKGROUND OF THE INVENTION

The present invention generally relates to a shrink wrap packaging apparatus and in particular to an apparatus for cutting shrink wrap film prior to the shrink wrapping operation.

In single roll shrink wrapping, a single sheet of shrink wrap film is wrapped around the product and into a tubular form. The overlapping lateral edges are located beneath the product and are sealed or otherwise joined together. During shrinking in a heat tunnel, the longitudinal edges of the shrink wrap film collapse against the ends of the product creating bullseye-type openings.

Various deficiencies exist in prior shrink wrap packaging and the methods of its fabrication. The single sheet of shrink wrap film was typically cut from a supply roll of the film. A common manner to cut the sheet from the web of film was to engage the film with a hot iron to melt the film and thus sever the sheet from the film. This hot iron is a high wear component and is always a source of operational problems. Another approach is to utilize a rotary blade which cuts the film. However, this approach experienced problems that the new leading edge of the web of film did not continue to follow the desired path of the film as a result of the velocity of the film and air resistance, the memory of the film, and/or the snap back of the film when the tension was released on the film because of cutting. These problems were overcome by cutting the film while the film is held across the cut and/or by including mechanical devices which grasp and pull the new leading edge, but such approaches unduly complicated the construction of the apparatus. Thus, there continues to be a need for feeding the film after a sheet is cut from the free end thereof which overcomes the deficiencies of the current approaches.

U.S. Pat. No. 5,771,662 (Struges et. al.), herein incorporated by reference, discloses an apparatus and methods for producing shrink wrap packaging. However, the Struges patent does not fully overcome the deficiencies of prior approaches, particularly in the area of cutting the film. Struges requires a vacuum table at the exit from the nip rollers to hold the film for further processing. The vacuum table is an expensive and complex piece of equipment which is not necessary for lower-speed operation. In addition, Struges requires a cutting blade that cuts tie strips into the film that allow the trailing edge of a single sheet of film which is downstream from the cut to remain connected to a new leading edge for the web of film which is upstream from the cut, so that the single sheet of film remains attached to the web of film thereby pulling the leading edge of the web of film toward and through the downstream pinch rollers 14 and 15 and to maintain tension of film between the upstream pinch rollers 12 and 13 and the downstream pinch rollers 14 and 15 and to ensure that the new leading edge of the web of film follows the desired path to the downstream pinch rollers.

The present invention overcomes the above deficiencies. It defines novel and non-obvious enhancements over the device described in U.S. patent application Ser. No. 10/960,238. In particular, it needs only a single nip roller pair rather than two roller pairs, it eliminates the need to keep tension on the film with the accompanying required programming complexity, it lessens snap-back of the film, and it eliminates folding-over the film by the second roller pair. Furthermore, the apparatus feeds the film so precisely even after it is cut, that the invention eliminates the need for an air knife to direct the new cut edge of the film into the rollers.

SUMMARY OF THE INVENTION

A cutting apparatus cuts shrink wrap film residing in a roll. The apparatus includes a first roller pair receiving the film from the roll and carrying the film away from the roll and without the need for a second roller pair to receive the cut sheet of film. Film snap-back is prevented by cutting the film between a shear deck with teeth and a rotating blade with teeth intermeshing with the teeth of the shear deck. A method for cutting a sheet of shrink wrap film, includes: feeding the film into a first roller pair; and cutting the film between the first roller pair and the second roller pair using a rotating knife with a number of teeth intermeshing with a shear bar with teeth.

A principal object and advantage of the present invention is that it eliminates the expense and complication of a vacuum table.

Another principal object and advantage of the present invention is that it eliminates tie strips cut into some kinds of film to feed the film into the second roller pair and maintain film tension.

Another principal object and advantage of the present invention is that it uses a single roller pair to pull the film from the roll and to hold the film as it is cut.

Another principal object and advantage of the present invention is that it eliminates the need for a second roller pair.

Another principal object and advantage of the present invention is that it does not need a stream of air to guide the leading edge of the film into a second roller pair.

DETAILED DESCRIPTION OF THE PREFERRED EMBODIMENT

Figure 1:
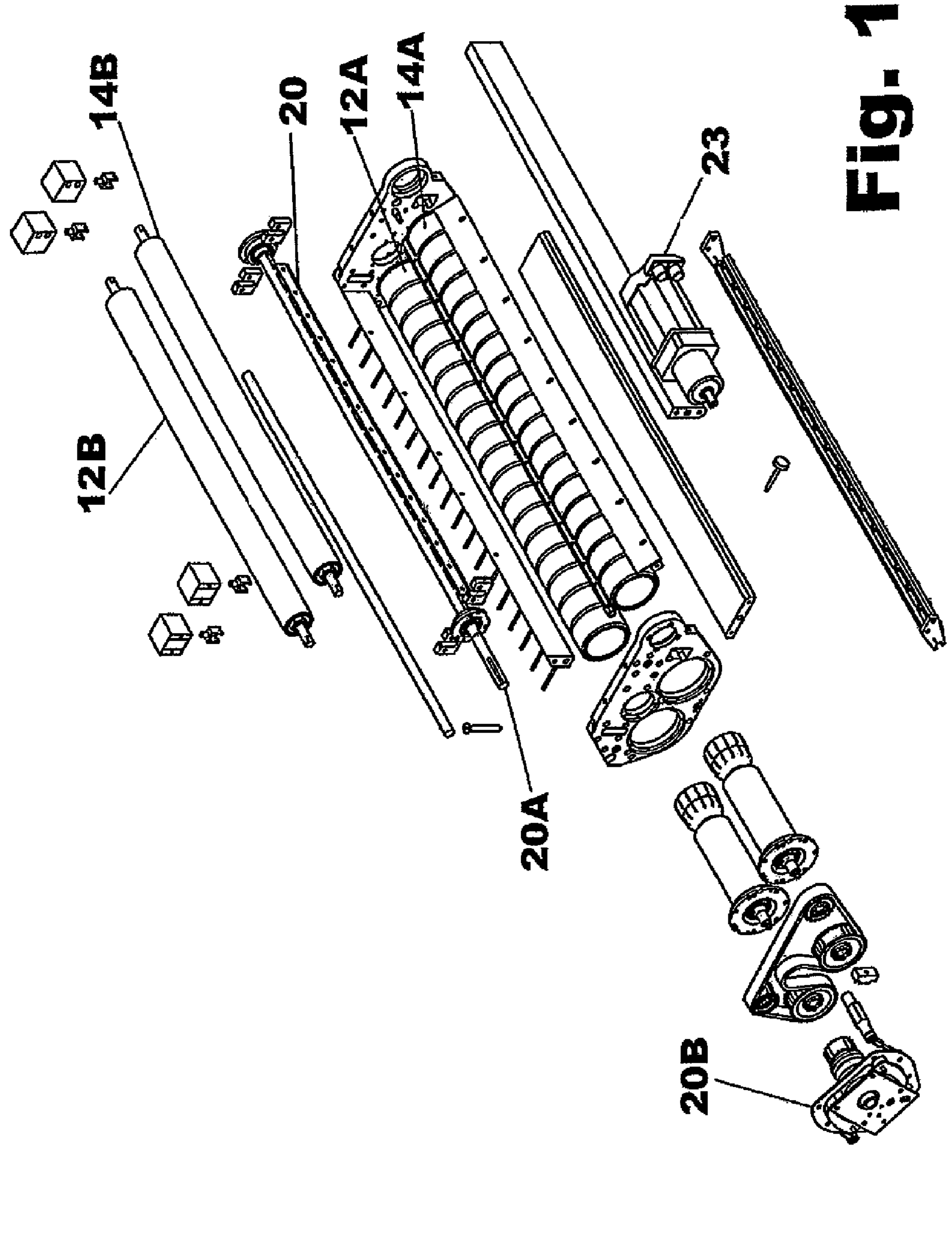
FIG. 1 is an exploded perspective view of the apparatus of the present invention.

The present invention is a cutting apparatus and method for cutting shrink wrap film and is generally shown in the drawings as reference numeral 10.

In one embodiment, the apparatus 10 comprises a first roller pair 12 adapted to receive the film F from its roll (not shown) and to carry the film F away from the roll. The apparatus 10 further comprises a second roller pair 14 adapted to receive the sheet of film F from the first roller pair 12 and carry the film F away from the first roller pair 12. The apparatus 10 further comprises a mechanism in the preferred form of air nozzles 16 for providing an air stream adapted to direct the leading edge E of the film F into the second roller pair 14. The apparatus 10 further comprises a mechanism 18 for regulating the pressure exerted by the second roller pair 14 against the sheet of film F thereby maintaining tension on the film F between the first roller pair 12 and the second roller pair 14. The apparatus 10 further comprises a rotating blade 20 adapted to cut the film F as the film F exits the first roller pair 12, thereby producing a cut sheet of film.

Figure 2:
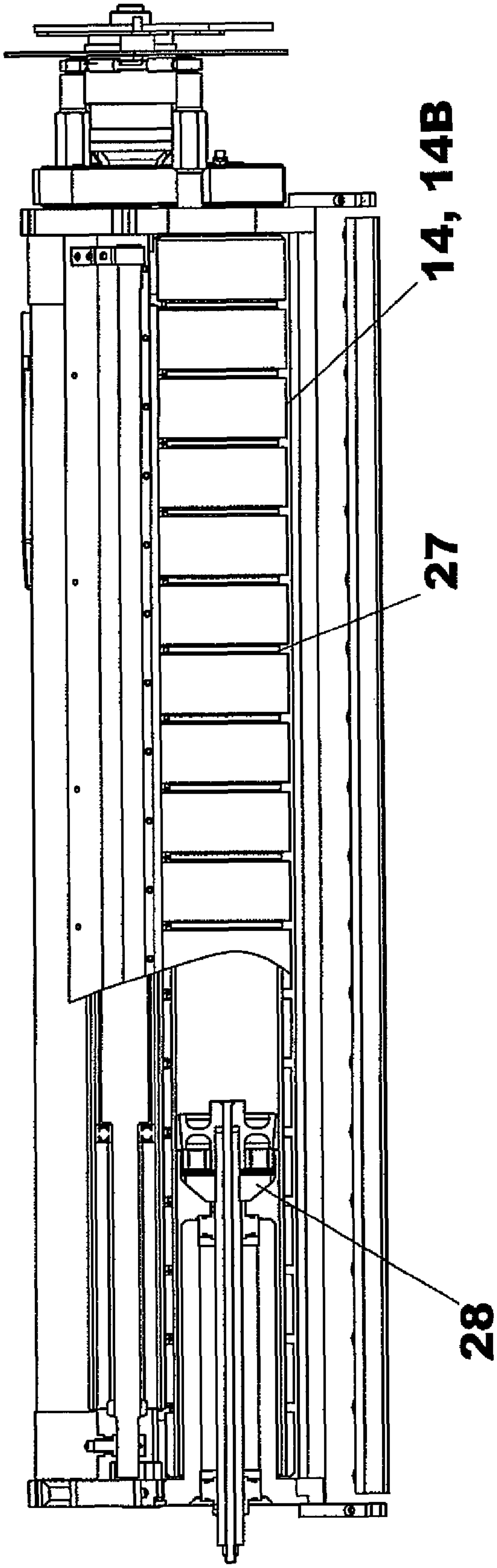
FIG. 2 is a front elevational view of the apparatus of the present invention.
Figure 3:
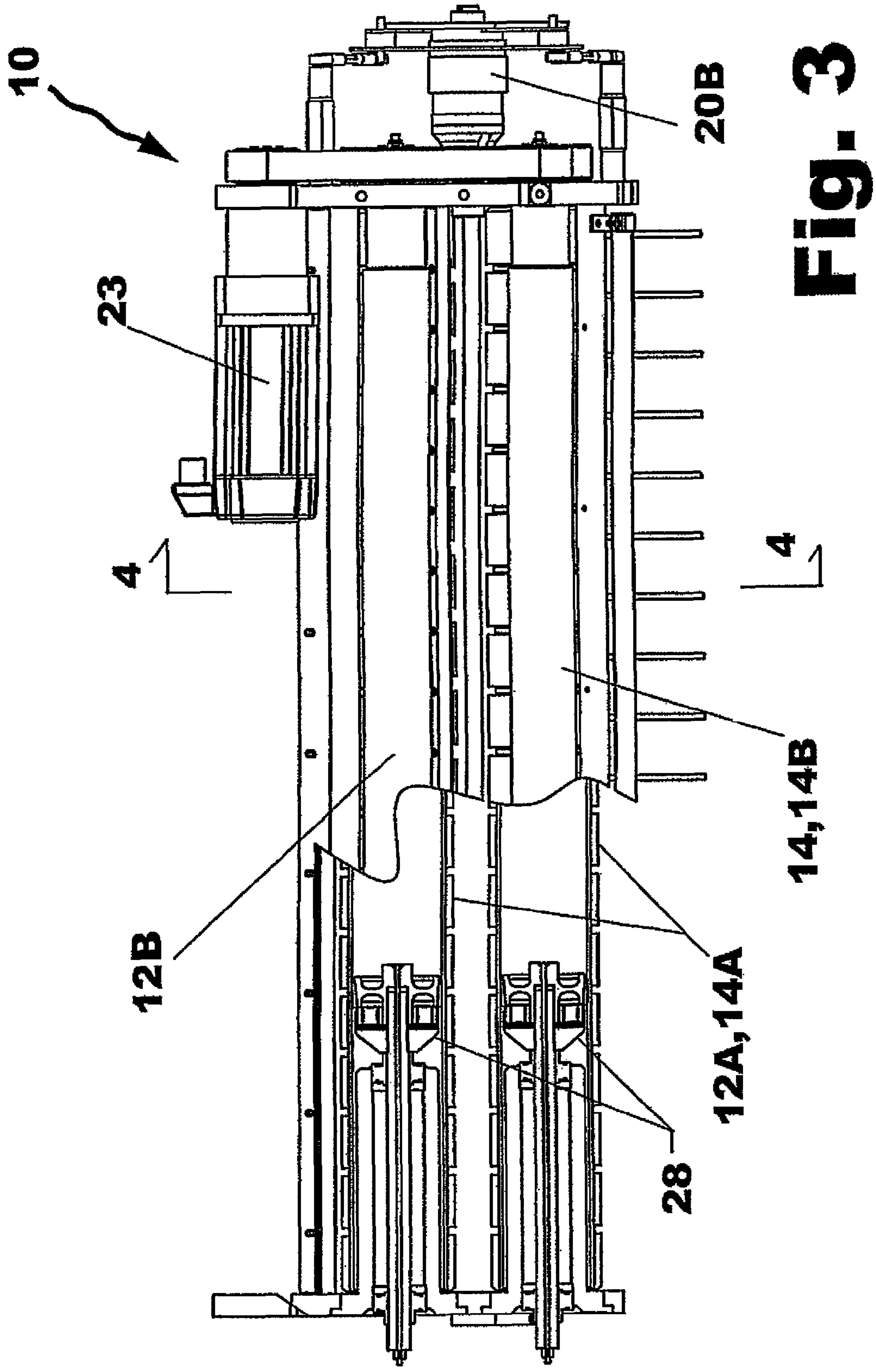
FIG. 3 is a top plan view of the apparatus of the present invention.

In one embodiment, the second roller pair 14 further comprises a driven roller 14A and a non-driven roller 14B engaging the driven roller 14A. A further mechanism presses the non-driven roller 14B against the driven roller 14A and producing a variable pressure between the non-driven roller 14B and the driven roller 14A. The first roller pair 12 may also comprise a driven roller 12A and a non-driven roller 12B. The driven roller 12A, 14A in each pair 12, 14 is preferably belt driven by a servomotor 23. The first roller pair 12 preferably has the non-driven roller 12B pressed against the driven roller 12A by air pressure. This air pressure can be set by the operator to consistently pull the film F from the roll without slippage, depending on the thickness and quality of the film F. Each driven roller 12A, 14A includes relief grooves 27, with the relief grooves 27 of the driven roller 12A being axially aligned with the relief grooves 27 of the driven roller 14A as shown in FIGS. 1-3.

The apparatus 10 may also preferably comprise a mechanism separating the non-driven roller 14B from the driven roller 14A.

The apparatus 10 may also preferably comprise a means (not shown) for coordinating the mechanism pressing the non-driven roller 14B against the driven roller 14A and the mechanism separating the non-driven roller 14B from the driven roller 14A whereby the resultant pressure between the non-driven roller 14B and the driven roller 14A can be varied. The means for coordinating may be any programmable means such as a digital computer or a PLC.

Preferably, the mechanism pressing the non-driven roller 14B against the driven roller 14A and the mechanism separating the non-driven roller 14B from the driven roller 14A are driven by air pressure, and the air pressure is varied through regulators (not shown) to control air cylinders. It should be noted that a single air cylinder may be used to control both the mechanism pressing the non-driven roller 14B against the driven roller 14A and the mechanism separating the non-driven roller 14B from the driven roller 14A separating the non-driven roller 14B from the driven roller 14A.

Preferably, the second roller pair 14 is geared to rotate a speed somewhat faster than the rotational speed of the first roller pair 12, which provides a way of stretching the film F to enhance the cutting action of the rotating blade 20. The second roller pair 14 may rotate 1% to 5% faster. Most preferably, the second roller pair 14 is geared to rotate about 3.6 % faster than the first roller pair 12.

Figure 4:
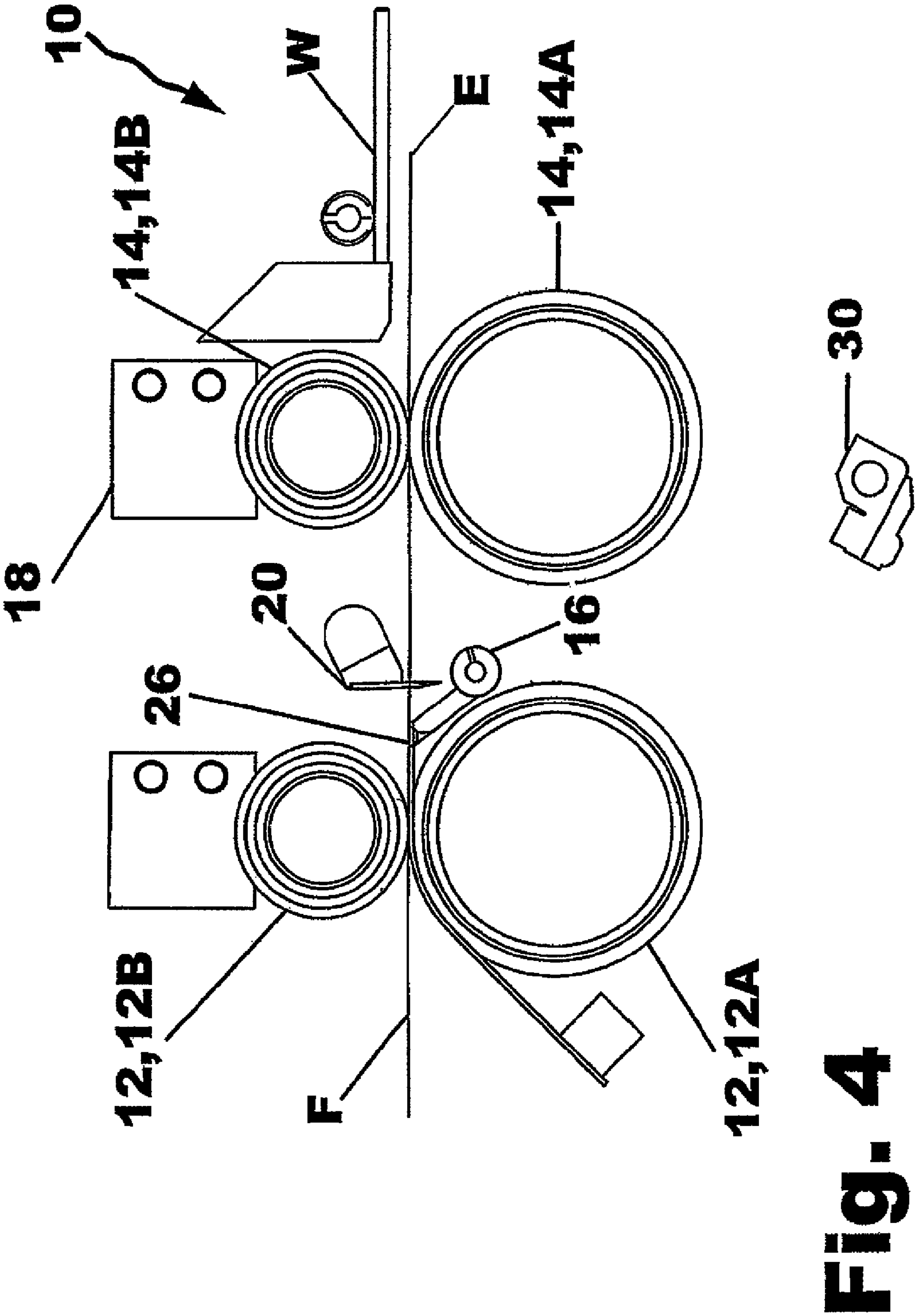
FIG. 4 is a schematic cross-section taken at approximately the lines 4 in FIG. 3.
Figure 5:
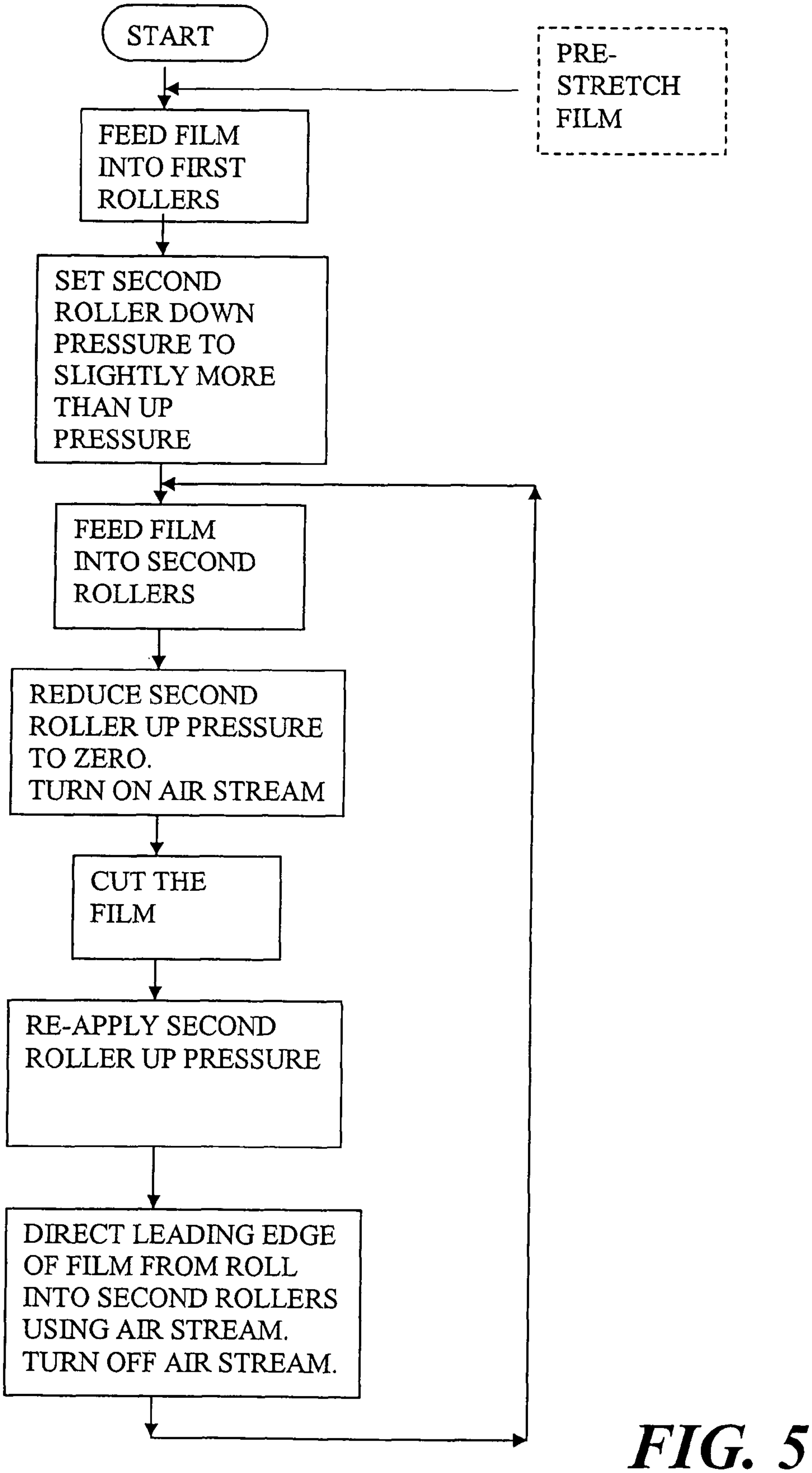
FIG. 5 is a flowchart of the method of the present invention.
Figure 6:
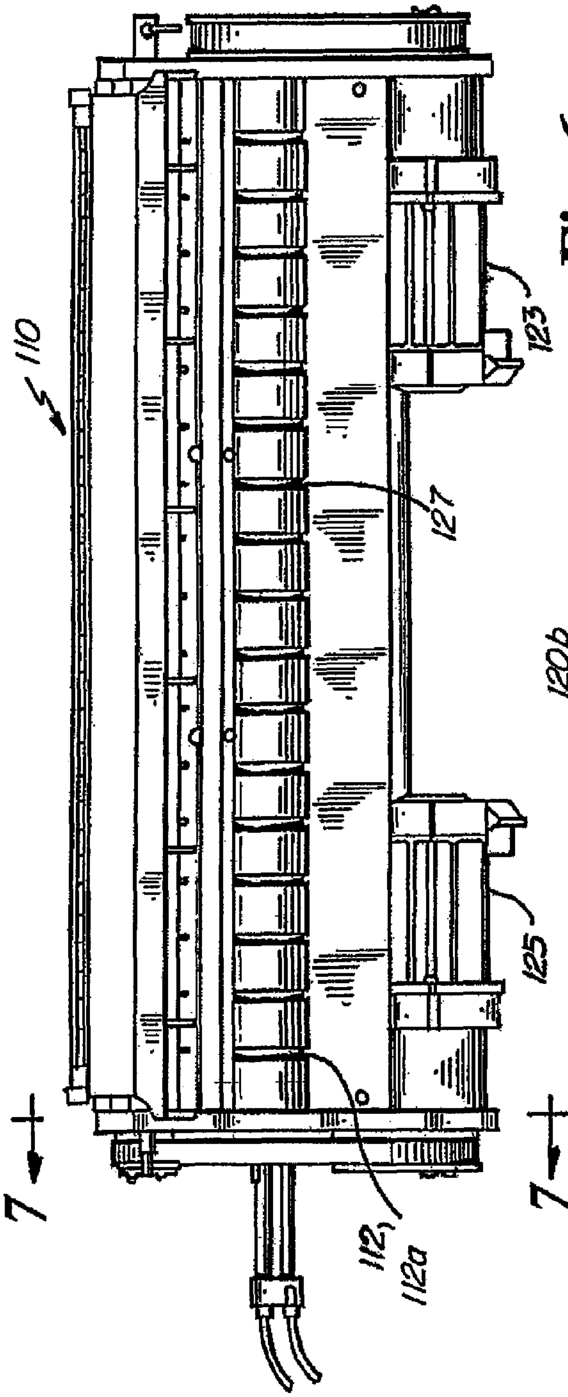
FIG. 6 is a top plan view of a second embodiment of the present invention.

Operation of the apparatus 10 and a description of the method will now be described, referring to FIGS. 4 and 5.

Optionally, the tension on the film F being fed into the first roller pair 12 may be increased to pre-stretch and flatten the film F. For example, this may be done by dancer bars (which are illustrated in the Struges patent).

The film F enters the first roller pair 12. The mechanism in the preferred form of air nozzles 16 then directs a stream of air against the leading edge E of the film, guiding the leading edge E into the second roller pair 14.

The air pressure applied to the second roller pair 14 is varied during each cutting cycle. Pressurized air is supplied to the air cylinders controlling the force exerted to hold the non-driven roller 14B against the driven roller 14A. At the start of the cycle, the air pressure forcing the second pair of rollers 14 together (down pressure) is slightly more than the pressure that would move the second pair of rollers 14 apart (up pressure). This balance of air pressures allows the second pair of rollers 14 to grip the film surface and feed film F received from the first pair of rollers 12 into the wrapping area W without allowing any slack to develop in the film F.

Because the second pair of rollers 14 rotate faster than the first pair of rollers 12, the film F slips on the surface of the driven roller 14A. Prior to cutting the film F, the up pressure on the roller 14B is reduced to zero. This eliminates the slippage between the film F and the driven roller 14A. The film F is pulled taut prior to being cut by the rotating blade 20. As the film F is cut and begins to separate, the up pressure to roller 14B is re-applied. This reduces film tension and minimizes film "snap back." This enhances the ability of the air nozzles 16 to guide the film leading edge E into the second pair of rollers 14 for the next cutting cycle.

The rotating blade 20 is positioned just above the film F and between the pairs of rollers 12 and 14. The rotating blade 20 is mounted on a knife shaft 20A that rotates in the same direction as the film travel. A clutch 20B is mounted on the knife shaft 20A. When the clutch 20B engages, the rotating blade 20 swings in an arc, contacting and cutting the film F.

A shear deck 26 is positioned between the first pair of rollers 12 and the rotating blade 20 and just outside the knife arc. This shear deck 26 provides a shear point to enhance the cutting action of the rotating blade 20.

After the film F is cut, the leading edge E of the cut film is directed and supported by streams of air from air nozzles 16 located in the shear deck 26. These air nozzles 16 are aligned with relief grooves 27 in the downstream driven roller 14A and, as relief grooves 27 in the downstream drive roller 14A are aligned with the relief grooves 27 in the upstream driven roller 12A, with the relief grooves 27 in the upstream driven roller 12A. The air stream flowing from each nozzle 16 and through a relief groove 27 creates a venturi effect. This venturi effect at each relief groove 27 aids in directing the leading edge of the film F between the downstream rollers 14A and 14B.

An air guiding mechanism 30 mounted downstream of the second pair of rollers 14 guides the film leading edge into the proper position for wrapping around the product.

Preferably, the pairs of rollers 12 and 14 are supported at intermediate points along their length by supports 28, thus preventing deflection. This is important in order to allow very light weight rollers to be used to reduce inertia.

A second embodiment of the present invention is generally shown in the Figures as reference numeral 110. The same elements of the first embodiment have the same reference number in the second embodiment with the addition of 100. This embodiment uses a single roller pair with a serrated cutting blade, rather than two roller pairs.

Figure 11:
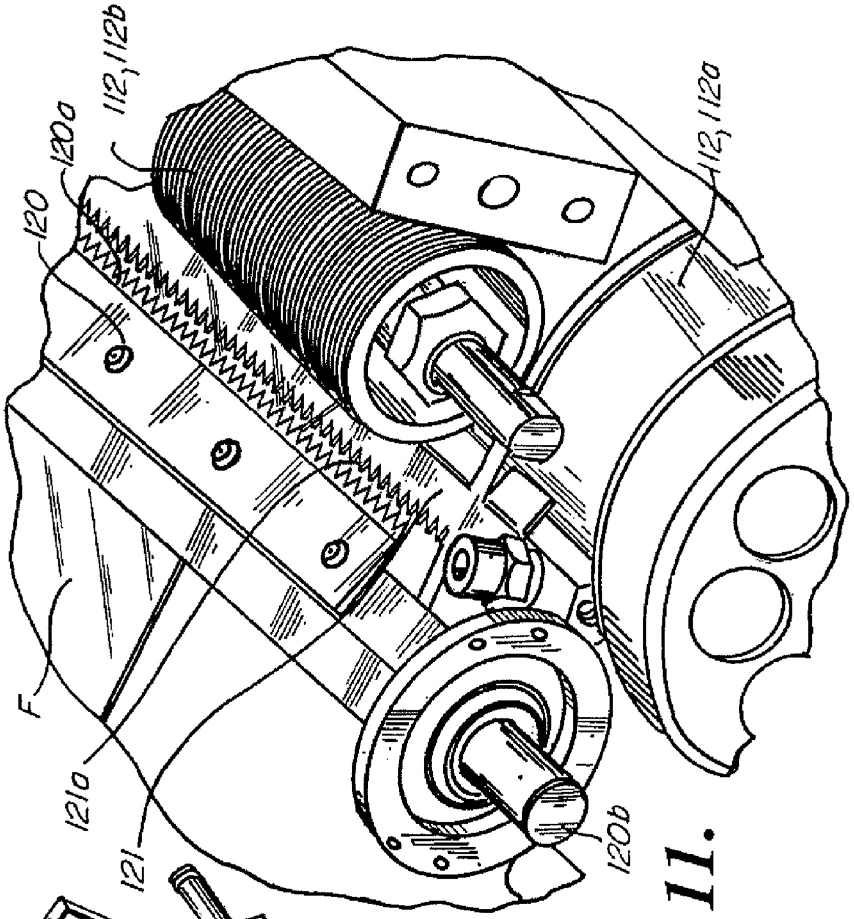
FIG. 11 is a detailed view shown at the dashed circle in FIG. 10.
Figure 10:
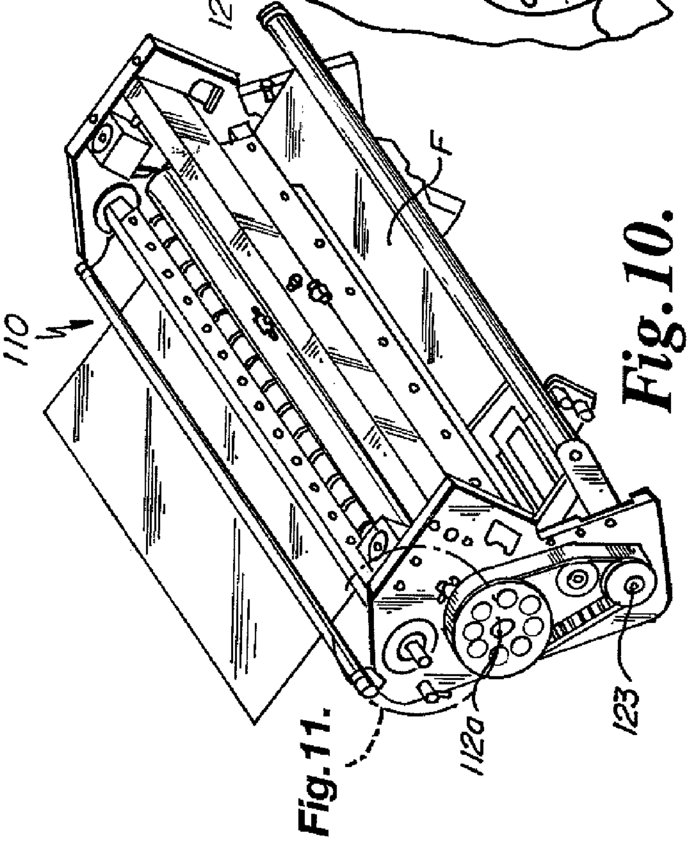
FIG. 10 is a perspective view of the embodiment of FIG. 6.
Figure 12:
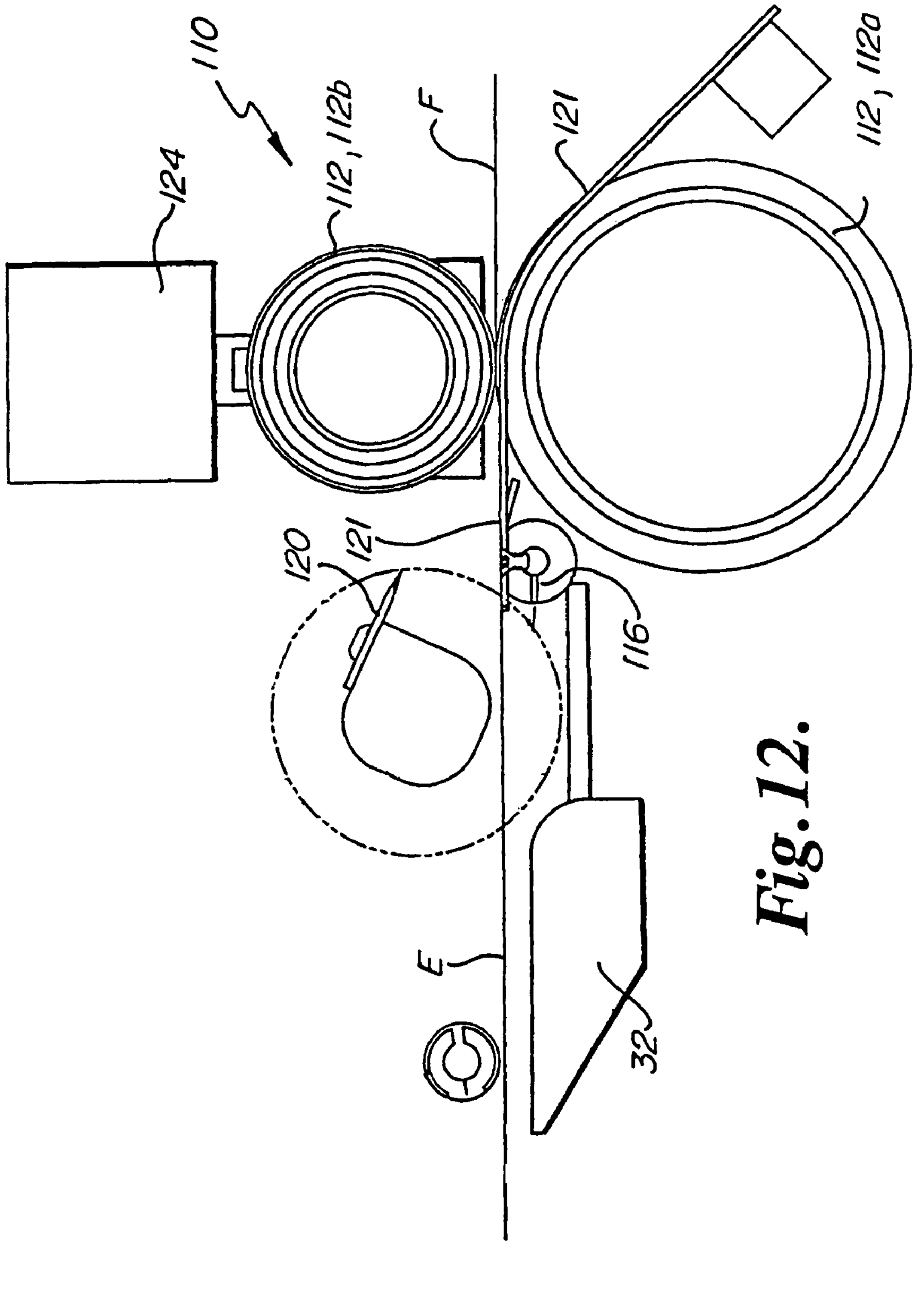
FIG. 12 is a schematic of the embodiment of FIG. 6.

The apparatus 110 comprises a first roller pair 112 adapted to receive the film F from its roll (not shown) and to carry the film F away from the roll. The apparatus 110 further comprises a rotating blade 120 adapted to cut the film F as the film F exits the first roller pair 112, thereby producing a cut sheet of film. The rotating blade 120 has serrated teeth 120*a*. As best seen in FIG. 11, the serrated teeth 120*a* mesh with second serrated teeth 121*a* on shear deck 121, cutting the film F between the two sets of teeth 120*a*, 121*a* and, preventing film snap-back.

Figure 9:
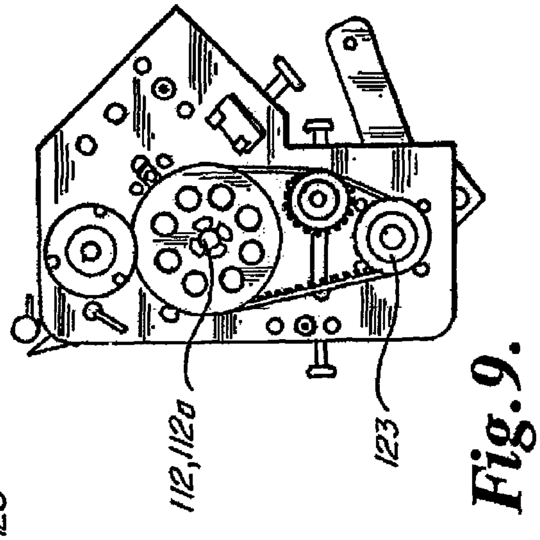
FIG. 9 is a cross-section taken at approximately the lines 9 of FIG. 8.

The first roller pair 112 may also comprise a driven roller 112*a* and a non-driven roller 112*b*. The driven roller 112*a* is preferably belt driven by a servomotor 123 (FIG. 9). The driven roller 112*a* includes relief grooves 127. The first roller pair 112 preferably has the non-driven roller 112*b* pressed against the driven roller 112*a* by air pressure provided by cylinder 124. This air pressure can be set by the operator to allow easy feeding of film F into the first roller pair 112, depending on the thickness and quality of the film F.

Operation of the apparatus 110 and a description of the method will now be described, referring to FIGS. 6-12.

Optionally, the tension on the film F being fed into the first roller pair 112 may be increased to pre-stretch and flatten the film F. For example, this may be done by dancer bars (which are illustrated in the Struges patent). However, the use of the interleaved teeth 120*a*, 121*a* to cut the film F substantially eliminates the need to keep tension on the film F.

The film F enters the first roller pair 112, then is fed by the first roller pair 112 across the shear deck 121. The film F is pulled taut prior to being cut by the rotating blade 120. As the teeth 120*a* mesh with the teeth 121*a*, the film F is cut cleanly without snapback.

Figure 7:
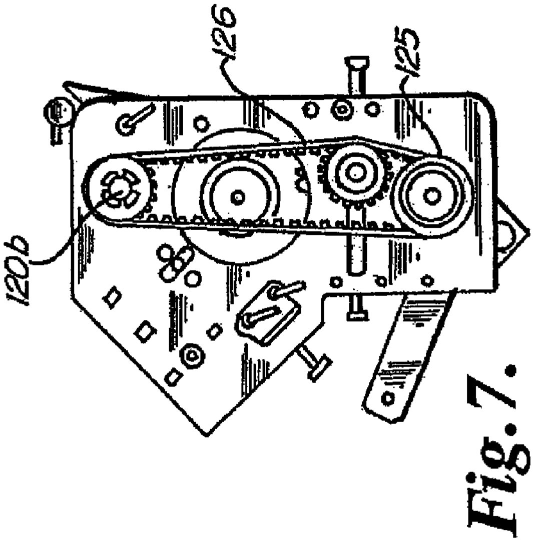
FIG. 7 is a cross-section taken at approximately the lines 7 of FIG. 6.
Figure 8:
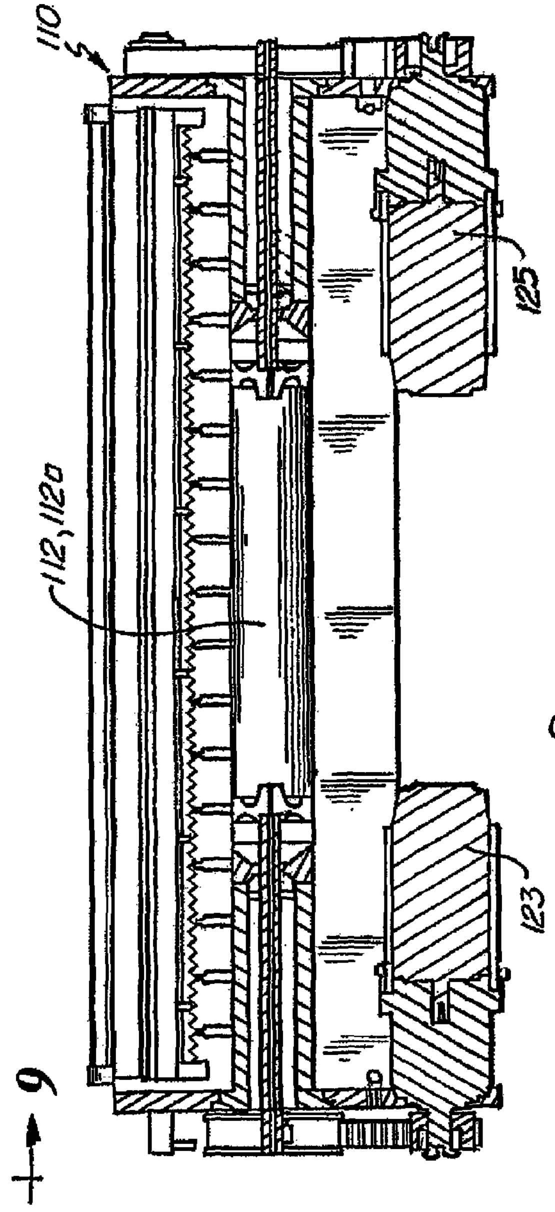
FIG. 8 is similar to FIG. 6 with some structure cut away.

The rotating blade 120 is positioned just above the film F and downstream the first pair of rollers 112. The rotating blade 120 is mounted on a knife shaft 120*b* that rotates in the same direction as the film travel. A clutch (not shown) may be used to connect the knife shaft 120*b* to a source of power. When the clutch engages, the rotating blade 120 swings in an arc, contacting and cutting the film F. Alternatively, the knife shaft 120*b* may be driven by a servomotor 125, suitably by a belt 126 (FIG. 7).

As in the first embodiment, after the film F is cut, the leading edge E of the cut film is directed and supported by streams of air from air nozzles 116 located in the shear deck 121. These air nozzles 116 are aligned with relief grooves 127 in the upstream driven roller 112A. The air stream flowing from each nozzle 116 and through a relief groove 127 creates a venturi effect. This venturi effect at each relief groove 127 aids in directing the leading edge of the film F onto the discharge deck 32.

Eliminating the need for a second pair of rollers to receive the leading edge of the cut film prevents folding over of the leading edge by the second pair of rollers. However, in some cases a second roller pair may be used, and such is considered to be within the scope of the present application.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A method for cutting a sheet of film, comprising:

(a) feeding the film into a first roller pair and onto a shear bar having a plurality of teeth, with the roller pair including a first roller and a second roller parallel to and engaging the first roller, with the first roller including a plurality of axially spaced, parallel relief grooves;

(b) cutting the film between the shear bar with the plurality of teeth and a rotating blade with a plurality of teeth intermeshing with the shear bar teeth, with the film located intermediate the shear deck and the first roller and the rotating blade, with the shear deck located intermediate the rotating blade and the roller pair, wherein cutting the film creates a leading edge of the film; and (c) directing the leading edge of the film onto a discharge deck after the teeth of the rotating blade intermesh with the teeth of the shear deck using a plurality of streams of air aligned with the plurality of axially spaced, parallel relief grooves.

2. A cutting apparatus for cutting shrink wrap film, comprising:

(a) a roller pair adapted to receive the film and carry the film away, with the roller pair including a first roller and a second roller parallel to and engaging the first roller, with the first roller including a plurality of axially spaced, parallel relief grooves;

(b) a rotating blade adapted to cut the film as the film exits the roller pair, thereby producing a cut sheet of film having a leading edge, the rotating blade having teeth;

(c) a shear deck with teeth intermeshing with the teeth of the rotating blade, with the film located intermediate the shear deck and the first roller and the rotating blade, with the shear deck located intermediate the rotating blade and the roller pair, thereby cutting the film without snapback; and (d) an air source carried by the shear deck directing the leading edge of the cut film after the teeth of the rotating blade intermeshes with the teeth of the shear deck, with the air source located intermediate the roller pair and the teeth of the shear deck.

3. The apparatus of claim 2, wherein the first roller comprises a driven roller and the second roller comprises a non-driven roller engaging the driven roller, with the apparatus further comprising a mechanism pressing the non-driven roller against the driven roller and producing a variable pressure between the non-driven roller and the driven roller.

4. The apparatus of claim 3, wherein the mechanism pressing the non-driven roller against the driven roller is driven by air pressure.

5. The apparatus of claim 2 with the second roller parallel to and engaging the first roller defining a receiving side and an exit side, with the film received in the receiving side, passing between the first pair of rollers, and exiting from the exit side, with the shear deck extending between the first roller and the second roller, with the exit side being intermediate the receiving side and the teeth of the shear deck.

6. The apparatus of claim 5 with the air source comprising air nozzles aligned with the plurality of axially spaced, parallel relief grooves and for supporting the leading edge.

7. The apparatus of claim 6 with the teeth of the rotating blade and of the shear deck being V-shaped separated by V-shaped notches.

8. The apparatus of claim 7 with the first roller being driven, with the second roller not being driven but rotated by engagement with the film and the first roller.

9. The apparatus of claim 2 with the air source comprising air nozzles, with the air nozzles aligned with the plurality of axially spaced, parallel relief grooves and for supporting the leading edge.

10. The apparatus of claim 2 with the teeth of the rotating blade and of the shear deck being V-shaped separated by V-shaped notches.

11. A cutting apparatus for cutting shrink wrap film, comprising:

(a) a roller pair adapted to receive the film and carry the film away, with the roller pair including a first roller and a second roller parallel to and engaging the first roller, with the first roller including a plurality of axially spaced, parallel relief grooves;

(b) a rotating blade adapted to cut the film as the film exits the roller pair, thereby producing a cut sheet of film having a leading edge, the rotating blade having teeth;

(c) a shear deck with teeth intermeshing with the teeth of the rotating blade, with the film located intermediate the shear deck and the first roller and the rotating blade, with the shear deck located intermediate the rotating blade and the roller pair, thereby cutting the film without snap-back;

(d) a discharge deck receiving the cut sheet of film; and (e) an air source directing the leading edge of the cut film onto the discharge deck after the teeth of the rotating blade intermesh with the teeth of the shear deck, with the air source located intermediate the roller pair and the teeth of the shear deck.

12. The apparatus of claim 11, wherein the first roller comprises a driven roller and the second roller comprises a non-driven roller engaging the driven roller, with the apparatus further comprising a mechanism pressing the non-driven roller against the driven roller and producing a variable pressure between the non-driven roller and the driven roller.

13. The apparatus of claim 12, wherein the mechanism pressing the non-driven roller against the driven roller is driven by air pressure.

14. The apparatus of claim 11 with the air source comprising air nozzles directing the leading edge onto the discharge deck, with air nozzles located intermediate the roller pair and the teeth of the shear deck.

15. A cutting apparatus for cutting shrink wrap film, comprising:

(a) a roller pair adapted to receive the film and carry the film away, with the roller pair including a first roller and a second roller parallel to, and engaging the first roller, with the first roller including a plurality of axially spaced, parallel relief grooves, the apparatus not having a further roller pair;

(b) a rotating blade adapted to cut the film as the film exits the roller pair, thereby producing a cut sheet of film having a leading edge, the rotating blade having teeth;

(c) a shear deck with teeth intermeshing with the teeth of the rotating blade, with the film located intermediate the shear deck and the first roller and the rotating blade, with the shear deck located intermediate the rotating blade and the roller pair, thereby cutting the film without snap-back;

(d) a discharge deck receiving the cut sheet of film; and (e) an air source directing the leading edge of the cut film onto the discharge deck after the teeth of the rotating blade intermesh with the teeth of the shear deck, with the air source located intermediate the roller pair and the teeth of the shear deck.

16. The apparatus of claim 15, wherein the first roller comprises a driven roller and the second roller comprises a non-driven roller engaging the driven roller, with the apparatus further comprising a mechanism pressing the non-driven roller against the driven roller and producing a variable pressure between the non-driven roller and the driven roller.

17. The apparatus of claim 16, wherein the mechanism pressing the non-driven roller against the driven roller is driven by air pressure.

* * * * *